Sept. 30, 1969   H. MAYR ET AL   3,469,516
ELECTROSTATIC CONTROL ARRANGEMENT OF A CAMERA DIAPHRAGM
Filed Aug. 30, 1966   2 Sheets-Sheet 1

INVENTOR.
HELMUT MAYR
RICHARD PELTE
BY
Michael S. Striker

Sept. 30, 1969     H. MAYR ET AL     3,469,516
ELECTROSTATIC CONTROL ARRANGEMENT OF A CAMERA DIAPHRAGM
Filed Aug. 30, 1966     2 Sheets-Sheet 2

INVENTOR.
HELMUT MAYR
RICHARD PELTE
BY
Michael J. Striker

United States Patent Office 3,469,516
Patented Sept. 30, 1969

3,469,516
ELECTROSTATIC CONTROL ARRANGEMENT
OF A CAMERA DIAPHRAGM
Helmut Mayr and Richard Pelte, Munich, Germany, assignors to Agfa-Gevaert Aktiengesellschaft, Leverkusen, Germany
Filed Aug. 30, 1966, Ser. No. 576,006
Claims priority, application Germany, Sept. 18, 1965, A 50,293
Int. Cl. G03b 9/02
U.S. Cl. 95—64  9 Claims

ABSTRACT OF THE DISCLOSURE

An arrangement for setting and controlling the opening of a diaphragm of a photographic camera by varying the potential applied across movable electrostatic members, The voltage potential for the electrostatic members is derived from a low voltage source containing a photosensitive element in its circuit. Through the use of a transformer circuit, the low voltage, varying as a function of the light intensity, is converted to a high potential suitable for applying across the electrostatic members. With variation in the resulting applied voltage, the size of the diaphragm opening is correspondingly varied as a function of the prevailing light intensity.

---

The invention relates to an arrangement for positioning the diaphragm for photographic or cinematographic cameras.

It is an object of the invention to provide an arrangement as defined above consisting of simple punched-out elements which is quite rugged and largely free of failure.

It is another object of the invention to provide an automatic and electrically operated actuation of a photographic camera diaphragm mechanism under the control of a potential dependent upon the illumination incident upon the diaphragm aperture.

It is a still further object of the invention to provide a damping control for the movement of the diaphragm as a function of the potential activating the diaphragm mechanism.

In accordance with the invention a plate each is provided for attachment to one or more of the movable diaphragm leaves. This plate is energized from a source of potential the voltage of which varies in accordance with the diaphragm position. As the diaphragm position responsive voltage charges the plate is arranged to enter into the space formed between two fixedly arranged parallel plates connected to the other terminal of the variable potential source.

In accordance with a further embodiment of the invention a simple damping control is provided for the diaphragm element which consists of a small plate secured to the element and which in the course of the movement of the diaphragm element moves toward a second fixedly arranged plate. Both of these damping control plates are connected to the same terminal of the potential source. In another embodiment, when an even number of diaphragm elements is used consisting of pairs of oppositely moving elements, each of the two diaphragm elements of a pair will be provided with a small plate arranged to move toward one another and connected to the same terminal of the potential source.

In order to improve the damping action a cylindrical type sleeve may be provided for one plate so that the other plate will be arranged to enter thereinto functioning as a piston. If desired, the stationary plates may be made adjustable.

In accordance with a further embodiment of the invention a potential converter is provided for the purpose of automatically positioning the diaphragm as a function of brightness acting on the converter circuit.

In addition to a simplified and reliable construction, the invention offers the further advantage that the diaphragm characteristic may be easily predetermined through the form of the plates and that damping can be achieved by means of a very simple expedient. If a light actuated control is desired, high value resistances may be used, which even for very low brightness have a very small photoelectric inertia.

Further characteristics and advantages of the invention may be deduced from the claims in connection with the following description of a number of embodiments as illustrated in the appended drawings, wherein:

Figure 1:
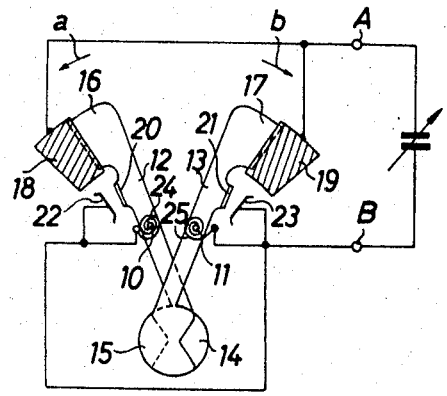
FIG. 1 is a view of a two leaf diaphragm in accordance with the invention shown in one terminal position.

In the embodiment of FIG. 1 there are two diaphragm elements 12 and 13 formed as levers rotatable about two stationary pivots 10 and 11. Each of the shutter elements respectively has an end portion 14 and 15 forming a diaphragm leaf provided with a cutout section while the other arm portion is formed to provide plates 16 and 17. The plates 16 and 17 during the rotary motion of the diaphragm elements 12 and 13 in the direction of the arrows A and B enter into the interspace formed between two parallel and fixedly arranged plates 18 and 19. The plates 18 and 19 are both connected to an electric terminal A. The diaphragm elements 12 and 13 and thereby plates 16 and 17 are conductively connected to the other terminal B. Terminals A and B are connected across a variable potential the amplitude of which is a measure of the adjustment of the diaphragm aperture.

Figure 2:
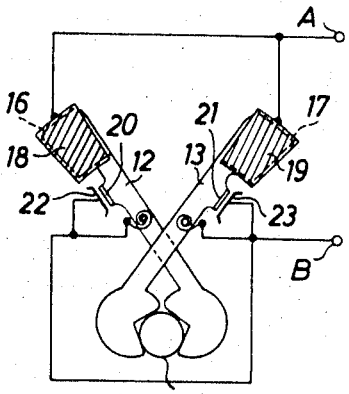
FIG. 2 shows a diaphragm in accordance with FIG. 1 in the other terminal position.

Each of the shutter elements 12 and 13 is further provided with a respective small plate 20 and 21 arranged at right angles to the direction of the movement of the diaphragm elements 12 and 13. In the position shown in FIG. 2 in which the plates 16 and 17 have fully entered into the interspace between plates 18 and 19, the small plates 20 and 21 are disposed immediately adjacent and parallel to the fixedly arranged plates 22 and 23. The small plates 20 and 21 are in electrical connection with terminal B by way of the shutter elements 12 and 13. The plates 22 and 23 are similarly connected to the same terminal so that there will be no potential difference between plates 20 and 22 or 21 and 23.

In the example shown, the electrical connection of the diaphragm elements 12 and 13 to the terminal B is made through the electrically conducting restorer springs 24 and 25. The journals of the pivots 10 and 11 are insulated in respect to the small plates 18 and 19 and thereby in respect to the terminal A.

Starting with the position of the element in accordance with the showing of FIG. 1, as the potential across terminals A and B is increased, the electrical field which is thereby established between plates 16, 17 and 18, 19 is formed such that the lines of force are obliged to seek the shortest possible path. This causes a movement of the small plates 16, 17 in the direction of the arrows a and b against the action of the restorer springs 24 and 25. Plates 16 and 17 as a consequence will enter between plates 18 and 19. The diaphragm leaves 14 and 15 thus act to open the aperture 26 to permit entrance of illumination therethrough. The adjusting movement is counteracted by the fields which have been established between the plates 20, 22 and 21, 23. Since these fields are considerably weaker than those produced between the plates 16, 18 and 17, 19 it follows that only a damping of the adjusting movement takes place.

In order to increase the positioning forces which act on the diaphragm elements 12 and 13 it is of course possible instead of the single plates 16 or 17 to associate with each of the diaphragm elements several parallel plates which may then enter into the interspace of a corresponding number of parallel counter plates. There is the further possibility that through a special form given to the plates 16, 17 or 18, 19 the dynamic characteristic of the diaphragm elements 12 and 13 may be controlled.

Figure 3:
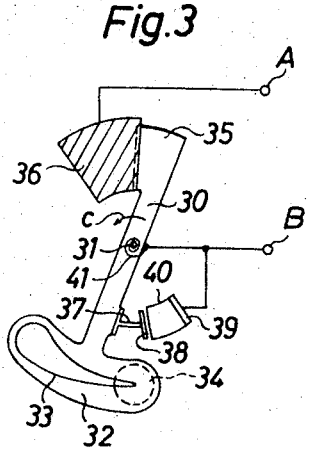
FIG. 3 is a view of a single leaf diaphragm in accordance with the invention.

FIG. 3 shows a diaphragm which comprises a single movable diaphragm element 30. The diaphragm element 30 is disposed to rotate about a fixed pivot 31 and at its end is formed with an elongated diaphragm leaf 32 having a trumpet or funnel-like decreasing slot 33 and which is capable, in a manner known in itself, of moving past the light admitting aperture 34. On the other end of the diaphragm element 30 there are disposed one or more parallel plates 35 which during a movement of the diaphragm element 30 in the direction of arrow c are capable of entering into the interspaces between the fixed plates 36.

The arm 37 of the diaphragm element 30 is additionally provided with a small plate 38 which, due to the movement of the diaphragm element 30, may be moved in the direction of the arrow c toward a stationary small plate 39. A cylindrical sleeve 40 is provided in front of the small plate 39 into which the plate 38 is introduced immediately after the beginning of the movement of the diaphragm element 3 from the end position shown in FIG. 3. The arrangement is such that small plate 39 together with the cylindrical sleeve 40 forms a cylinder into which small plate 38 is made to enter with as tight a fit as possible.

In this arrangement too, plates 36 are connected to terminal A and the plate or plates 35 as well as small plates 38 and 39 are electrically connected to terminal B.

As the potential across the terminals A and B is increased the plate 35 of the diaphragm element 30 is again drawn in the direction of arrow c against the action of the restorer spring 41. Small plate 38 thereby is made to enter sleeve 40 and approaches small plate 39. In this arrangement therefore, damping is achieved not only by means of the fields between the plates 38 and 39 but there is also included additional air damping.

Figure 4:
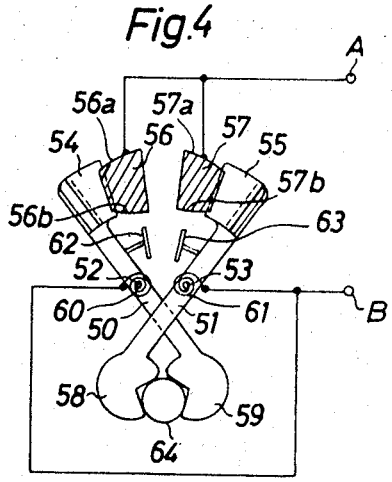
FIG. 4 is a view of another double leaf diaphragm.

FIG. 4 illustrates a shutter which consists of two diaphragm elements 50 and 51 which are rotatably disposed about fixed pivots 52 and 53. Several parallel plates 54 and 55 are disposed on the one end of the diaphragm elements 51 and 50 which are adapted to enter into the interspaces of parallel and stationary plates 56 and 57. In order to attain a predetermined dynamic characteristic, the outer edges 56a, 56b, 57a, 57b of the stationary plates 57 and 56 have been shown to have curved conformations. The other ends of diaphragm elements 50 and 51 are again provided with shutter leaves 58 and 59. The diaphragm elements 50 and 51 which are subject to the action of restorer springs 60 and 61 are again provided each with small plates 62 and 63, respectively. The small plates 62 and 63 are so arranged that they assume a position parallel one with respect to the other whenever the diaphragm attains its end position wherein the light admitting aperture 64 has been covered as far as possible. In this arrangement too, plates 56 and 57 are connected to terminal A, and plates 54 and 55 as well as small plates 62 and 63 are again connected to terminal B to which a variable potential may be applied.

The arrangement shown in FIG. 4 differs from the examples previously described in that the damping is achieved through the medium of elements attached to the two diaphragm elements 50 and 51. Furthermore, in this case the diaphragm is closed when the potential between the terminals A and B is a maximum.

The diaphragm shown in FIGS. 1 to 4 may in principle be operated with potentials which are manually adjustable. However, there is of course the possibility to control the potentials as a function of light.

Figure 5:
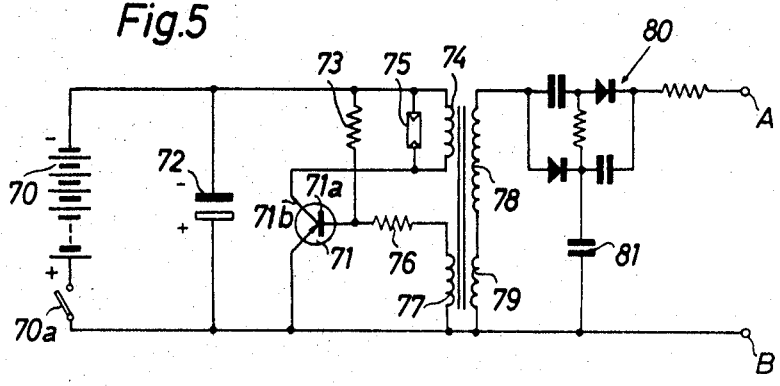
FIG. 5 shows the circuit of a potential converter for the automatic and light-responsive control of a diaphragm in accordance with the invention.

A particularly advantageous arrangement for cinematographic pickup cameras is shown in FIG. 5. Here a light responsive potential converter is disposed between a direct current source 70 which, for instance, may be a battery and the terminals A and B for the diaphragm. The converter produces a high secondary potential from the low voltage battery potential through periodical interruption of the connection to the direct current source 70 by means of a transistor 71 acting as an electronic switch. A condenser 72 is provided on the primary side of the potential converter in parallel with the direct current source 70 so as to prevent any troublesome effect due to the inner resistance of the direct current source which for short periods of time may be carrying a high load. A negative bias potential is applied to the base 71a of the transistor 71 through the resistor 73 which assures that the potential converter starts to operate immediately after the supply control switch 70a has been closed. A winding 74 and a photoresistance 75 are disposed in parallel branches between the negative side of the source 70 and the collector 71b of the transistor 71. In addition, a resistance 76 and another winding 77 are connected in series with the base 71a.

Two additional windings 78 and 79 are provided on the secondary side. Between these windings and the terminal points A and B there is disposed a doubler circuit 80 and a smoothing condenser 81.

Upon closing of the switch 70a, a rapidly increasing collector current flows through the transistor 71. A potential is thereby induced into the winding 77 from the winding 74 which serves as a base potential for the transistor 71 and thereby causes an increasing base current through the resistance 76. Since the collector current in accordance with the transistor characteristic does not increase indefinitely, at a certain period of time (termination of the current increase) no further voltage will be induced in the winding 77. Consequently, a decrease will take place of the base and collector currents of the transistor 71. The transistor therefore is blocked. Simultaneously, a peak potential occurs in the winding 74 which is translated into the secondary winding 78, 79 in accordance with the transformer relationship. The resultant secondary potential is doubled and rectified in the doubler circuit which under certain conditions may be omitted. The value of the primary potential and therewith of the secondary potential is determined through the size of the resistance of the photoresistance unit 75 and is accordingly dependent upon incident light.

Figure 6:
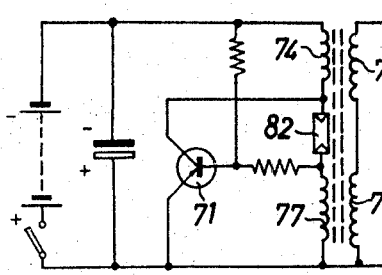

A light responsive control for the potential may also be achieved in the manner shown in FIG. 6. Here a photoresistance 82 is disposed between the windings 74 and 77. In this arrangement the collector-base path of the transistor 71 is in shunt with the photoresistance 82.

Figure 8:
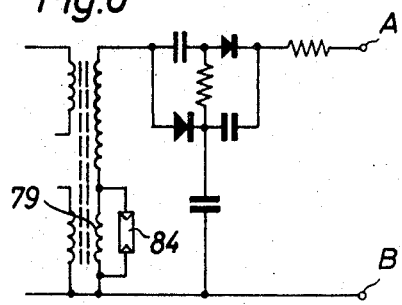
FIGS. 6, 7 and 8 show circuits with partial illustrations of modified circuits.
Figure 7:
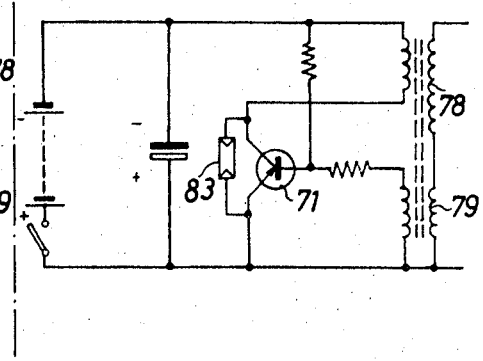

In FIG. 7, another possibility is shown for obtaining a light dependent potential variation on the primary side of the potential converter. In this instance, a photoresistance 83 bridges the collector-emitter path of the transistor 71. As shown in FIG. 8 it is also possible to place the photoresistance 84 across the secondary side of the winding 79. In all cases the photoresistance makes a light dependent damping of the potential converter possible.

The invention is not to be limited to the embodiments described herewith. More particularly, it is possible to use instead of the lever type diaphragm elements other diaphragm forms such as shutter disks. There is the further possibility to activate only a single diaphragm element and to have connected therewith further diaphragm elements preferably by means of mechanical inter connections from the first element as a consequence of the adjustment thereof.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention.

What is claimed as new and desired to be secured by Letters Patent is:

1. An apparatus for the automatic adjustment of the diaphragm for a photographic camera, comprising in combination movable diaphragm means, means for effecting movement of said movable diaphragm means toward a desired position including means for producing an electrical force field in respect to said diaphragm means; a source of electrical potential for energizing said electrical field producing means; means for varying said electrical potential in accordance with said desired position of said diaphragm means, said diaphragm means comprising at least one movably mounted element having a first portion for controlling the light admitting aperture of a camera and a second portion, said electrical force field producing means including said second portion and at least one stationary member adjacent thereto and means for electrically connecting said second portion and said stationary member to the respective opposite poles of said electrical potential source, said diaphragm means comprising further a lever rotatably mounted on a pivot, a plate-like formation at the first portion of said lever, a pair of plates parallel to one another and stationary with respect to said lever disposed so as to receive said plate-like formations therebetween, said lever and plate formations being electrically connected with one terminal and said pair of plates being in electrical connection with the other terminal of said potential source; and a second plate on said lever and a third stationary plate relative to said second plate, said third plate being connected to said one terminal, whereby the movement of said lever is subject to a damping effect due to the electrical field between said second and third plates.

2. An apparatus for the automatic adjustment of the diaphragm for a photographic camera, comprising in combination movable diaphragm means, means for effecting movement of said movable diaphragm means toward a desired position including means for producing an electrical force field in respect to said diaphragm means; a source of electrical potential for energizing said electrical field producing means; means for varying said electrical potential in accordance with said desired position of said diaphragm means, said diaphragm means comprising at least one movably mounted element having a first portion for controlling the light admitting aperture of a camera and a second portion, said electrical force field producing means including said second portion and at least one stationary member adjacent thereto and means for electrically connecting said second portion and said stationary member to the respective opposite poles of said electrical potential source, said diaphragm means comprising further a lever rotatably mounted on a pivot, a plate-like formation at the first portion of said lever, a pair of plates parallel to one another and stationary with respect to said lever disposed so as to receive said plate-like formations therebetween, said lever and plate formations being electrically connected with one terminal and said pair of plates being in electrical connection with the other terminal of said potential source; and a second lever and a second pair of plates, said levers and plates corresponding in all respects and mounted for rotation of said plate formations away from each other.

3. An apparatus for the automatic adjustment of the diaphragm for a photographic camera, comprising in combination movable diaphragm means, means for effecting movement of said movable diaphragm means toward a desired position including means for producing an electrical force field in respect to said diaphragm means; a source of electrical potential for energizing said electrical field producing means; means for varying said electrical potential in accordance with said desired position of said diaphragm means, said diaphragm means comprising at least one movably mounted element having a first portion for controlling the light admitting aperture of a camera and a second portion, said electrical force field producing means including said second portion and at least one stationary member adjacent thereto and means for electrically connecting said second portion and said stationary member to the respective opposite poles of said electrical potential source, said diaphragm means comprising further a lever rotatably mounted on a pivot, a plate-like formation at the first portion of said lever, a pair of plates parallel to one another and stationary with respect to said lever disposed so as to receive said plate-like formations therebetween, said lever and plate formations being electrically connected with one terminal and said pair of plates being in electrical connection with the other terminal of said potential source; and a second lever and a second pair of plates, said levers and plates corresponding in all respects and mounted for rotation of said plate formations toward each other.

4. An apparatus for the automatic adjustment of the diaphragm for a photographic camera, comprising in combination movable diaphragm means, means for effecting movement of said movable diaphragm means toward a desired position including means for producing an electrical force field in respect to said diaphragm means; a source of electrical potential for energizing said electrical field producing means; means for varying said electrical potential in accordance with said desired position of said diaphragm means, said diaphragm means comprising at least one movably mounted element having a first portion for controlling the light admitting aperture of a camera and a second portion, said electrical force field producing means including said second portion and at least one stationary member adjacent thereto and means for electrically connecting said second portion and said stationary member to the respective opposite poles of said electrical potential source, said diaphragm means comprising further a lever rotatably mounted on a pivot, a plate-like formation at the first portion of said lever, a pair of plates parallel to one another and stationary with respect to said lever disposed so as to receive said plate-like formations therebetween, said lever and plate formations being electrically connected with one terminal and said pair of plates being in electrical connection with the other terminal of said potential source; a second plate on said lever and a third stationary plate relative to said second plate, said third plate being connected to said one terminal, whereby the movement of said lever is subject to a damping effect due to the electrical field between said second and third plates; and a dash pot disposed for receiving said second plate additional damping being provided thereby.

5. An apparatus for the automatic adjustment of the diaphragm for a photographic camera, comprising in combination movable diaphragm means, means for effecting movement of said movable diaphragm means toward a desired position including means for producing an electrical force field in respect to said diaphragm means; a source of electrical potential for energizing said electrical field producing means; means for varying said electrical potential in accordance with said desired position of said diaphragm means, said electrical potential source and said potential varying means comprising source of direct current and a light responsive current converter in series therewith, said current converter including a switching transistor, a transformer circuit, a photoresistor in said transformer circuit and a voltage doubler in the secondary of said transformer circuit.

6. Apparatus for setting automatically the diaphragm of a photographic camera comprising, in combination, first and second electrostatic means movable relative to each other and varying the opening of said diaphragm as a function of the relative position between said first and second electrostatic means; a source of electrostatic potential connected to said first and second electrostatic means for positioning said electrostatic means relative to each other as a function of the magnitude of said electrostatic potential; photosensitive means in said source of electrostatic potential for varying said potential as a function of the prevailing light intensity impinging upon said photosensitive means; and damping means for damping the motion of said first and second electrostatic means when increasing and decreasing the opening of said diaphragm, whereby the opening of said diaphragm is automatically varied as a function of the prevailing light intensity.

7. The apparatus as defined in claim 6 wherein said damping means includes means for producing an electrical force field acting in opposition to the force field established across said first and second electrostatic means by said source of electrostatic potential.

8. The apparatus as defined in claim 6 wherein each of said first and second electrostatic means comprises a movable electrostatic member connected to one terminal of said source of electrostatic potential and a stationary electrostatic member cooperating with said movable member and connected to the other terminal of said source of electrostatic potential so that an electrostatic force field is established between said movable member and said stationary member, the position of said movable member relative to said stationary member being dependent upon the potential difference applied to said members by said source of electrostatic potential.

9. The apparatus as defined in claim 6 including voltage converter means for raising a voltage from a low level to a high level and applying the high level voltage to said electrostatic means, said source of electrostatic potential being a source of D.C. potential.

References Cited

UNITED STATES PATENTS

| | | | |
|---|---|---|---|
| 2,661,456 | 12/1953 | Bosch | 324—109 |
| 2,973,699 | 3/1961 | Nerwin. | |
| 3,082,674 | 3/1963 | Bagby. | |
| 3,295,428 | 1/1967 | Nerwin. | |

NORTON ANSHER, Primary Examiner

JOSEPH F. PETERS, JR., Assistant Examiner

U.S. Cl. X.R.

324—109, 125